United States Patent [19]

Thomas

[11] Patent Number: 4,474,004
[45] Date of Patent: Oct. 2, 1984

[54] POWER-OPERATED BOOSTERS

[75] Inventor: Alfred W. Thomas, Koblenz, Fed. Rep. of Germany

[73] Assignee: Girling Limited, Birmingham, England

[21] Appl. No.: 403,322

[22] Filed: Jul. 30, 1982

Related U.S. Application Data

[63] Continuation of Ser. No. 212,798, Dec. 4, 1980, abandoned, which is a continuation of Ser. No. 7,216, Jan. 29, 1979, abandoned.

[30] Foreign Application Priority Data

Jan. 31, 1978 [GB] United Kingdom ............... 3782/78
May 4, 1978 [GB] United Kingdom ............. 17622/78

[51] Int. Cl.$^3$ ............................................. B60T 13/00
[52] U.S. Cl. ..................................... 60/547.1; 60/574; 91/391 R; 91/460
[58] Field of Search ............... 60/547.1, 547.2, 547.3, 60/548, 553, 555, 574; 91/359, 365, 373, 391 R, 460

[56] References Cited

U.S. PATENT DOCUMENTS

| 2,032,185 | 2/1936 | Sciaky | 60/576 |
|---|---|---|---|
| 2,799,140 | 7/1957 | Osborne | 60/555 |
| 3,253,409 | 5/1966 | Kellogg | 60/547.1 |
| 3,714,869 | 2/1973 | Flory | 91/391 R |
| 3,889,467 | 6/1975 | Huffman | 60/548 |
| 3,926,092 | 12/1975 | Meyers | 60/548 |
| 3,978,669 | 9/1976 | Belart | 60/549 |
| 3,979,912 | 9/1976 | Kuromitsu | 60/547.1 |
| 4,114,376 | 9/1978 | Cattaneo | 60/555 |
| 4,123,908 | 11/1978 | Bertone | 60/555 |
| 4,161,867 | 7/1979 | Adachi | 60/547.2 |
| 4,196,592 | 4/1980 | Nomura | 60/547.2 |
| 4,225,022 | 9/1980 | Belart | 60/549 |

Primary Examiner—Abraham Hershkovitz
Attorney, Agent, or Firm—Scrivener Clarke Scrivener and Johnson

[57] ABSTRACT

A pedal-operated booster incorporates a valve mechanism for controlling pressurization of a boost chamber. The valve mechanism comprises a pedal-operated piston and a pressure-responsive valve spool which is coupled to the piston for limited relative movement in a longitudinal direction within a working chamber in the piston. The spool is movable with the piston in an initial brake-applying direction in which the spool is operative to isolate the boost chamber from an exhaust port and the piston is operative to place an inlet port in communication with the working chamber. This causes the spool to move relatively away from the piston in response to pressure fluid in the working chamber which is admitted to the boost chamber.

16 Claims, 3 Drawing Figures

POWER-OPERATED BOOSTERS

This application is a continuation of application Ser. No. 212,798, filed Dec. 4, 1980 now abandoned which is a continuation of Ser. No. 007,216 filed Jan. 29, 1979 and now abandoned.

SPECIFIC DESCRIPTION

This invention relates to pedal-operated boosters for vehicle braking systems of the kind in which a boost piston for augmenting an output force is advanced in a bore in a housing in response to high pressure fluid admitted into a boost chamber in the bore behind the piston, and the admission of high pressure fluid to the boost chamber from an inlet port in the housing for connection to a source of high pressure fluid is controlled by booster control valve means operative to close a connection between the boost chamber and an exhaust port in the housing for connection to a reservoir for fluid and to open communication between the inlet port and the boost chamber.

In most known boosters of the kind set forth a considerable initial movement of the pedal is necessary to take up lost-motion before the output force from the booster can be used to actuate brake applying means, for example an hydraulic master cylinder. For example, the initial pedal movement has to operate the booster control valve means in sequence. Subsequent pedal movement, following pressurisation of the boost chamber, then must accomplish movement of the piston of the master cylinder which, in the rest position is connected to the fluid reservoir, and the piston of the master cylinder finally must be moved to close the connection with the fluid reservoir before fluid in the pressure space, in advance of its piston, can initially be pressurised to take-up brake clearances. In a typical 1g stop the total lost-motion amounts to substantially one third of a pedal stroke. The pedal ratio must be designed to be low enough to ensure that this stroke loss does not lead to an unacceptably long pedal stroke. A low pedal ratio can be made higher and the shorter pedal output stroke can be converted into a longer input stroke in comparison with the master cylinder input stroke, by using hydraulic stroke gain. In such a construction the pedal feel will remain the same as that of a low ratio pedal with a known booster. But when the booster pressure fails, the higher pedal ratio facilitates the development of a higher brake pressure for a given input force, of course with the penalty of a longer pedal stroke.

The pedal ratio is chosen to suit the failed booster situation and the booster is altered to produce a reasonable pedal feel to the driver during normal brake actuation.

One attempt at solving these problems by reducing the amount of pedal stroke which is utilised in taking up the lost-motion is described in G. B. Patent Specification No. 1 369 742. In G. B. Patent Specification No. 1 369 742 a pedal-operated input plunger extends into a working chamber for hydraulic fluid and the working chamber has a connection with the booster control valve means. The boost piston is carried by a piston-rod of a diameter smaller than the plunger and the piston-rod extends into the working chamber at its opposite free end. Due to the difference in areas between the plunger and the piston-rod, displacement of fluid in the working chamber by inward movement of the plunger through a smaller distance is accommodated by movement of the piston-rod through a greater distance and a "stroke-gain" is achieved. Upon failure of the high pressure fluid, stroke-gain cancelling means are operable to cancel out the stroke-gain by relieving fluid trapped in the working chamber. This enables the plunger to move relative to, and act directly upon, the piston rod. This results in the plunger/boost piston stroke ratio being equal to unity and the reaction force or feel of the pedal being stiffened up.

According to our invention in a pedal-operated booster of the kind set forth the control valve means has a pressure responsive face, and an input piston is incorporated for causing fluid under pressure to be applied to the face, at least during an initial movement of the input piston in a brake-applying direction, application of the fluid under pressure to the pressure-responsive face causing the control valve means to move relative to the input piston in a brake-applying direction, isolating the boost chamber from the exhaust port and placing the boost chamber in fluid communication with the inlet port.

Only a very small movement of the pedal is required to cause the said initial movement of the input piston. The further lost-motion normally to be taken up by movement of the pedal is instead compensated for by the movement of the control valve means relatively away from the input piston without further movement of the pedal.

The "stroke-gain" is achieved by relative movement of the control valve means away from the input piston in response to the application of fluid under pressure to the pressure-responsive face. It follows therefore that upon failure of the pressure fluid there will be no "stroke-gain" to be cancelled out and no necessity for providing stroke-gain cancelling means.

Preferably the control valve means comprises a pressure-responsive valve spool which is coupled to the input piston for limited relative movement in a longitudinal direction within a working chamber provided in the input piston and which is adapted to be placed in communication with the inlet port during the said initial movement of the input piston.

The distance through which the spool moves away from the input piston is determined by a stop on the input piston the position of which is chosen such that the point at which the spool engages with the stop is reached shortly after the piston of the master cylinder closes its recuperation port. Thereafter the spool and the pedal move together in the brake-applying direction with the boost piston, to pressurise the pressure space of the master cylinder and apply the brakes.

When the high pressure fluid fails, the input piston and the spool move together with the input piston engaging with the boost piston. This occurs at a point when the input piston has moved towards the boost piston through a distance which is slightly greater than the distance through which the input piston has normally to move towards the boost piston before the boost chamber can be pressurised.

One embodiment of our invention is illustrated in the accompanying drawings in which.

Figure 1:
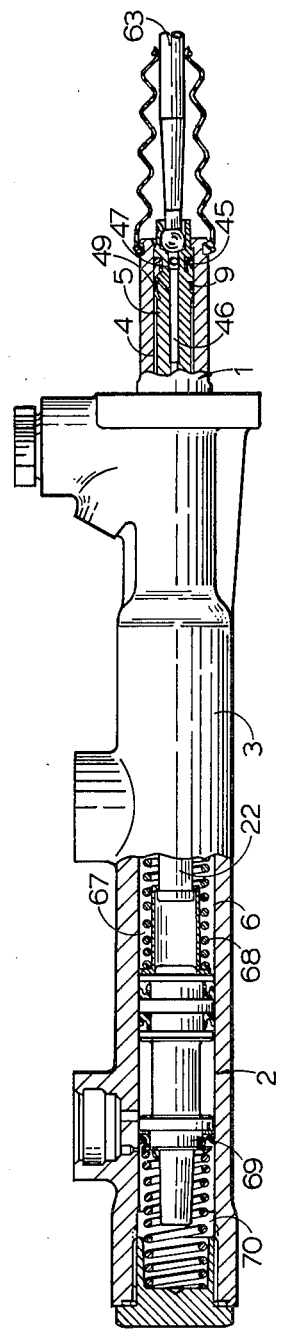
FIG. 1 is a view of a pedal-operated booster and master cylinder assembly for an hydraulic braking system including longitudinal sections through opposite end portions.
Figure 2:
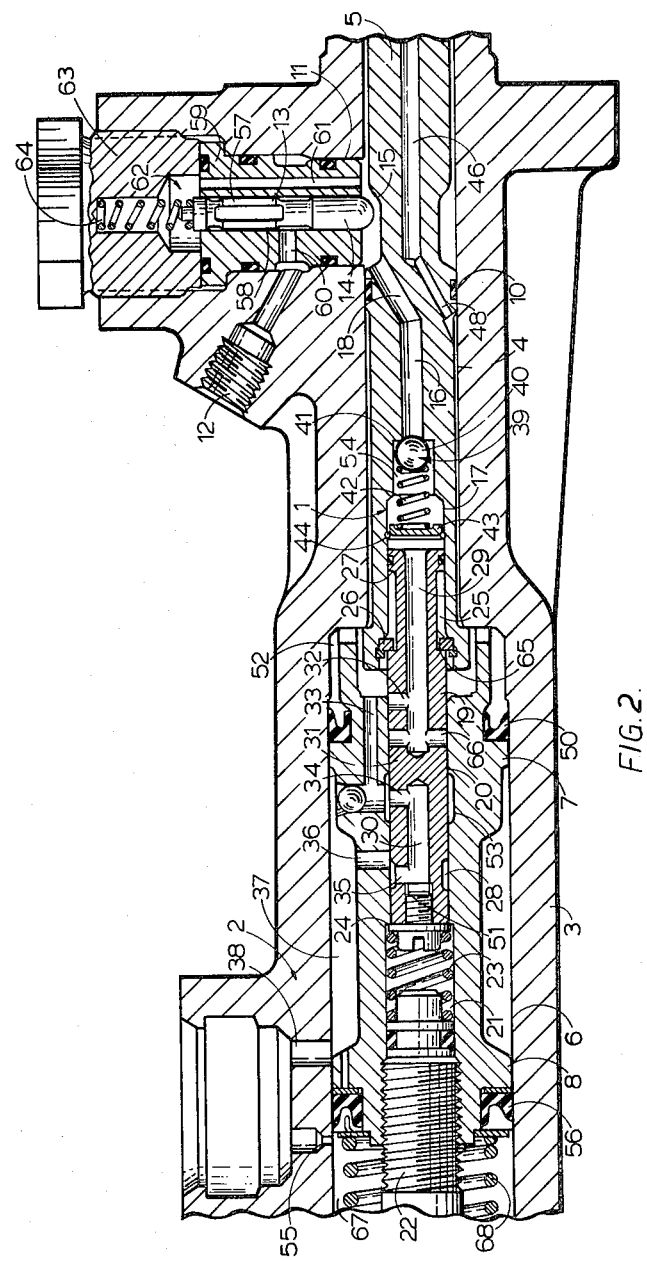
FIG. 2 is a longitudinal section on an enlarged scale of the intermediate portion of FIG. 1.

The assembly illustrated in the drawings comprise a pedal-operated booster 1 for operating an hydraulic master cylinder 2 with which it is combined. The assembly may have a common housing 3 comprising any convenient number of parts. The housing 3 has a longitudinally extending stepped bore portion 4 of smaller diameter in which works a pedal-operated piston 5, and a second bore portion 6 of greater diameter in which works a boost piston 7 and a piston 8 of the master cylinder 2 with which the boost piston 7 is integral, although it need not be so produced.

The piston 5 is provided with axially spaced seals 9 and 10 which slide in portions of the bore portion 4 on opposite sides of an opening 11 in the wall of the bore portion 4.

An pressure port 12 in the housing 1 connected to a source of high pressure fluid, suitably an hydraulic accumulator not shown, communicates with the opening 11 through a normally closed pressure inlet valve 13 having a stem 14 which projects into the bore portion 4 and is normally spaced axially from a radial shoulder 15 on the piston 5 when the piston 5 is in the retracted position shown.

A longitudinally extending bore 16 in the inner end of the piston 5 is counterbored at 17 at its inner end and at its outer end leads into the bore portion 4 between the seals 9 and 10 through an inclined passage 18.

A one-piece valve spool 19 working through a bore 20 in the boost piston 7 is received at its outer end in the counterbore 17 and its inner end projects into an enlarged chamber 21. The chamber 21 is sealingly closed at its inner end by a threaded plug 22 which also projects away from the piston 8. A return compression spring 23 housed in the chamber 21 acts on the spool 19 to urge the spool 19 at its inner end into engagement with a shoulder 24 at the step in diameter between the bore 20 and the chamber 21. The opposite outer end portion of the spool 19 is provided with an axially extending annular recess 25 in which is slidably received a radial shoulder 26 on the piston 5. This couples the spool 19 to the piston 5 for relative movement of the spool away from the piston 5 through a distance limited by the distance between the shoulder 26 and a shoulder 27 at the outer end of the recess 25 which is remote from the chamber 21. The opposite end of the spool 19 is provided with an external annular recess 28.

The spool 19 is bored at 29 and 30 at opposite ends, on opposite sides of a central partition 31. The bore 30 is in open communication at all times with the chamber 21, through an axial bore in a stop screw 51 which is screwed into the inner end of the spool 19 and which engages with the shoulder 24 to define the retracted position of the spool 19.

A radial port 32 in the spool 19 leads through an axially extending passage 3 in the piston 7, into the chamber 53 and thence through a radial port 34 in the spool 19, the bore 30, a radial port 35 in the spool 19, and through a radial port 36 in the boost piston 7 into a chamber 37 which is in permanent connection with an exhaust port 38 leading to a reservoir for fluid.

A one-way valve 39 is housed in the piston 5 between the spool 19 and the bore 16. The one-way valve 39 comprises a valve member in the form of a ball 40 which is urged into engagement with a seating 41 defined by a shoulder at the step in diameter between the bore 16 and the counterbore 17 by means of a spring 42. The spring 42 abuts against an apertured abutment plate 43 which is located in the counterbore 17 by a circlip 44.

The piston 5 carries a third seal 45 which is located on the side of the seal 9 which is remote from the seal 10, and the piston 5 is provided with an axial bore 46 which is closed at its outer end by means of a plug 47 and which provides communication at all times through inclined passages 48 and 49 with portions of the stepped bore 6 which are disposed, respectively, between a seal 50 on the piston 7 and the seal 10, and the seals 9 and 45.

In the retracted position shown a boost chamber 52 to the rear of the piston communicates with the exhaust port 38 through the passage 33, an annular recess 53 in the wall of the bore 20, the port 34, the passage 30, the ports 35 and 36, and the chamber 37. In addition a working chamber 54 defined by the communicating bores 29 and 17 also communicates with the boost chamber 52 through a port 32. The boost chamber 52 and the working chamber 54 are therefore both vented to reservoir.

The exhaust port 38 is spaced axially to the rear of the recuperation port 55, also communicating with the reservoir, and when the piston 8 is in the retracted position shown, the seal 56 of the piston 8 is located between the ports 38 and 55.

Finally the inlet valve 13, which is pressure balanced, is closed. As illustrated the stem 14 carries a spool 57 which works in a bore 58 in a guide member 59. The guide member 59 has a radial port 60 which communicates with the pressure port 12, and a longitudinally extending inlet port 61 providing communication between the bore portion 4 and a chamber 62 defined between the guide member 59 and a clamp screw 63 for clamping the guide member 59 against the housing 3. A spring 64 urges the inner end of the stem 14 towards the piston 5 to close the valve and, in such a position, the spool 57 cuts off communication between the port 60 and the inlet port 61 through the chamber 62.

In operation, depression of the pedal advances the piston 5 in the bore through a thrust rod 63, and the spool 19 is carried forward with it, by engagement of the shoulder 26 in the piston 5 with a face of a shoulder 65 at the inner end of the recess 25, to close the port 32 thereby isolating the working chamber 54 from the reservoir. Simultaneously this small initial movement of the piston 5 urges the shoulder 15 into engagement with the stem 14 to open the pressure balanced control valve 13. Pressure fluid is then supplied from a pressure source through the chamber 62, the inlet port 61, a chamber defined by the bore portion 4 which is disposed between the seals 9 and 10 and into the working chamber 54 through the passages 18 and 16 and past the one-way valve 39 which opens. The fluid pressure acts in opposite directions on the adjacent faces of equal area of the seals 9 and 10 so that the piston 5 is held in pressure balance, but the fluid in the working chamber 54 acts on the adjacent outer end of the spool 19 to move the spool 19 forwardly towards the master cylinder 2 against the loading of the spring 23 and relative to the piston 5. Forward movement of the spool 19 first closes communication between the radial port 36 in the boost piston 7 and the port 35. Further movement then allows pressurised fluid to flow from the working chamber 54 through a diametral port 66 in the spool 19 at the inner end of the bore 29 and into the recess 53 from whence it flows to the boost chamber 52 through the passage 33. The boost chamber 52 is constituted by the diameter of the complete piston 7.

The fluid pressure in the bore portion 4, inwardly of the seal 10, reacts against the piston 5. This together with fluid pressure in the chamber 54 reacting against the area of the bore 17 provides a reaction or feel on the pedal, and pressurisation of the boost chamber 52 urges the boost piston 7 forward to operate the piston 8 of the master cylinder.

The chamber 21 in which the spring 23 is housed is also pressurised by fluid supplied through the port 34 and the bore 30. Due to the movement of the boost piston 7 causing an increase in the effective volume of the boost chamber 52 and the pressure loss in the passages, the pressure in the chamber 21, and in the bore portion 4 inwardly of the seal 10, the boost chamber 52 itself will initially be at a lower pressure than the pressure in the working chamber 54.

The boost piston 7 will move forward with the spool 19 until the shoulder 27 on the spool engages with the shoulder 26 on the piston 5. This acts as a stop to prevent further movement of the spool 19 in that direction relative to the piston 5. Further movement of the boost piston 7 in the same direction will close the port 66 in the spool 19 to isolate the boost chamber 52 from the working chamber 54. The components of the assembly are so arranged that at this point the seal 56 on the piston 8 will have passed the recuperation port 55 by a predetermined distance and hence the pressure in the pressure space 67 of the master cylinder 2 in advance of the piston 56 and which is supplied to the brakes, will be at a predetermined relatively low level.

Further movement of the piston 5 in a brake-applying direction will allow the spool 19 to move further forward relative to the boost piston 7, with the result that further fluid is admitted into the boost chamber 52, to advance the piston 7 further thereby applying the brakes.

When the pedal is released, the piston 5 is returned by the action of the fluid pressure acting on the area of the piston 5 defined by the seal 10. The spool 19 moves relatively away from the piston 7 to cut-off communication between the diametral port 66 and the recess 53 and then opens communication between the bore 33 and the recess 53. The boost chamber 52 is thereby placed in communication with the chamber 37 through the bores 33, 34 and 35.

The pressure in the brake system acting on the inner end of the piston 8 is operative to urge the piston 8 relatively towards the pedal-operated piston 5. This movement continues so long as no reaction force is applied to the piston 5 through the push-rod 63 and until the piston 5 is restored to its retracted position as illustrated in the drawings. During this time the spring 23 will have been continuously urging the spool 19 in the same direction, relatively towards the piston 5, and the residual boost pressure in the boost chamber 52, which is always maintained by the pumping action of the piston 8 as it returns to its retracted position, acts on the inner face of the piston 5 to urge it towards its retracted position.

Until the piston 5 has moved rearwardly into its retracted position, the valve 13 will be held open so that high pressure fluid is applied to the outer end face of the piston 19 which will remain extended inwardly relative to the piston 5. When the valve 13 closes the slightest leakage from the bore 29 into the chamber 37 through the normal clearances of the spool 19 will reduce the pressure in the working chamber 54, allowing the spring 23 to return the spool 19 to its retracted position.

Thereafter any slight leakage from the pressure port 12 through the clearances of the spool 57 and into the bore 16 will pass to the chamber 37 through the communicating passages and bores in the spool 19 and the piston 7. Such slight leakage can therefore never cause high pressure to be developed in the boost chamber 52 and self-operation is therefore prevented.

Under normal conditions the pressure in the boost chamber 52 which is required to produce maximum retardation will be substantially less than even the cut-in pressure of the accumulator. However, if a greater force is applied through the pedal to the input piston 5, the pressure in the boost chamber 52 will rise. This will continue until, if the force applied to the pedal is sufficiently large, that pressure will equal the pressure in the accumulator and, without the provision of the one-way valve 39, will flow back into the accumulator as the input piston 5 is pushed into the boost chamber 52 until it abuts the boost piston 7.

As this happens the pedal will appear to give suddenly as the input piston 5 is moved inwardly and, thereafter, the braking pressure can be further increased, but only by direct manual effort. There are two serious disadvantages of this characteristic, namely: (a) the driver may feel that something has broken, or is about to break; and (b) the stroke loss is wasteful of available pedal movement.

Since the one-way valve 39 prevents the fluid in the working chamber 54 from returning to the accumulator, and because the input piston 5 and the boost piston 7 are of different areas, the fluid trapped in the boost chamber 52 acts as an hydraulic lever enabling the normal ration between input and output forces to be retained although of course the pedal movement will be increased during this phase.

If the input force is increased to a point where the input piston 5 abuts the boost piston 7, then the hydraulic lever is lost and any further increase in braking pressure can only be achieved by direct manual effort as before.

Figure 3:
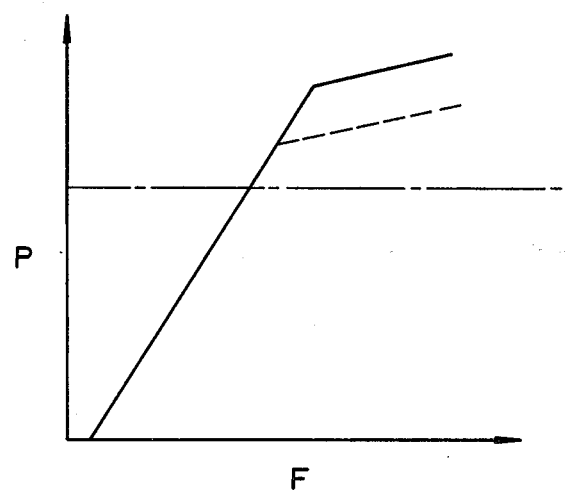
FIG. 3 is a graph of pressure plotted against pedal force.

FIG. 3 is a graph showing pressure (p) plotted against pedal input force (f) with a longitudinal line indicating a deceleration at 1g.

It will be seen that although the ratio between (p) and (f) shown in chain-dotted outline, which indicates the absence of the one-way valve 39, is the same as that shown in full lines with the one-way valve 39 present, the "knee-point" occurs at a higher pressure.

The outermost external seal 45 on the piston 5 must be leak-proof and is therefore made of an elastomeric material, suitably rubber. If the seal 45 was constantly loaded to full inlet pressure high friction levels would ensue, which would be noticed as high hysteresis. The seal 45 is however separated from the high pressure by means of the seal 9, which can be made of non-elastomeric low friction material, suitably polytetra-fluorethyline (P.T.F.E.). Any slight leakage past the seal 9 is led to the boost chamber 52 through passages 49, 46 and 48. The seal 45 is therefore only subjected to instantaneous boost pressure in the boost chamber 52. Since the boost pressure is always proportional to the input force, the friction losses caused by the seal 45 under pressure will also be proportional to the input force, and therefore relatively insignificant.

As previously stated the piston 8 of the master cylinder and the boost piston 7 need not be integrally formed. The diameter of the boost piston 7 and master cylinder piston 8 need not necessarily be the same as the booster can be built completely separate from the master cylinder and can be mechanically and hydraulically interconnected.

As illustrated the master cylinder 2 can be of tandem construction with a secondary or floating piston 69 working in the bore 6 in front of the piston 8 to pressurise fluid in a second pressure space 70 in front of the piston 69.

In the booster described above the spool 19 is of one-piece construction. In a modification the spool may be of two-part construction with one part working only in the bore in the piston 7, and the other part working in the bore 17. Adjacent ends of the two part are in sealing engagement. Such a construction would assist in eliminating any sealing problems which may arise due to the absence of concentricity between the bores 4, 17 and 20 and the spool 19.

Also the booster described above is arranged to utilise an hydraulic fluid common with that used in the braking system and a common reservoir is utilised for both systems. Such a fluid comprises a vegetable oil.

Since it is generally desirable to utilise a mineral oil in vehicle power systems, it may be more convenient to pressurise the boost chamber 52 with mineral oil. This can be achieved by providing a second exhaust port in the housing 3 leading from the chamber 37 to a second reservoir from mineral oil, and sealing source from the existing port 38 for the master cylinder 2.

I claim:

1. A pedal-operated booster for a vehicle braking system comprising a housing provided with a longitudinal bore, an inlet port for connection to a fluid pressure source, and an exhaust port for connection to a reservoir for fluid, an input piston working in said longitudinal bore and a boost piston for augmenting an output force also working in said longitudinal bore, said boost piston being adapted to be advanced in said bore in response to pressurisation by said fluid pressure from said source, a boost chamber in said longitudinal bore behind said boost piston, a booster control valve means for controlling the pressurisation of said boost chamber by said fluid pressure, said control valve means being operative following movement of said input piston in a brake-applying direction to shut off communication between said boost chamber and said exhaust port, and to open communication between said inlet port and said boost chamber, said control valve means comprising relatively movable parts including a bore in said boost piston and a valve mechanism located in said bore in said boost piston, said valve mechanism having a pressure responsive face, movement of said input piston in a brake-applying direction causing said fluid pressure from said source to be applied to said pressure-responsive face, said application of said fluid from said source to said pressure-responsive face causing said control valve means to open communication between said inlet port and said boost chamber.

2. A pedal-operated booster as claimed in claim 1, wherein said control valve means comprises a pressure-responsive valve spool, and coupling means are provided for coupling said spool to said input piston for limited relative movement in a longitudinal direction within a working chamber provided in said input piston and which is adapted to be placed in communication with said inlet port during the said initial movement of said input piston.

3. A pedal-operated booster as claimed in claim 1, including a spring for urging said control valve means towards said input piston.

4. A pedal-operated booster as claimed in claim 2, wherein a piston of a master cylinder is acted upon by said boost piston, and a recuperation valve is closed by movement of said piston of said master cylinder in a brake-applying direction, and wherein a stop for limiting the distance through which said spool can move away from said input piston is carried by said input piston, the position of said stop being chosen such that the point at which said spool engages with said stop is reached shortly after said piston of said master cylinder can close said recuperation valve.

5. A booster as claimed in claim 2, wherein said input piston and said spool move together upon failure of said pressure fluid, and said input piston has a part for engagement with said boost piston after said spool moves towards said boost piston through a distance which is slightly greater than the distance through which said input piston has normally to move towards said boost piston with said high pressure fluid operative before said boost chamber can be pressurised.

6. A booster as claimed in claim 2, wherein said input piston is provided with a pair of axially spaced seals which seal against the wall of said bore, and a high pressure inlet valve is provided for admitting high pressure fluid into said bore between said seals whereby said input piston is held in pressure balance, and the pressure fluid in said working chamber can act on said pressure-responsive face to move said control valve means relatively away from said input piston.

7. A booster as claimed in claim 6, wherein said inlet valve incorporates a stem, and said input piston has a shoulder disposed between said seals and which is engageable with said stem to open said inlet valve when said input piston is moved inwardly in said brake-applying direction.

8. A booster as claimed in claim 6, wherein said input piston has a passage which provides communication between a region of said bore defined between said two seals and said working chamber, and a one-way valve is housed in said input piston to prevent flow from said working chamber into said passage.

9. A booster as claimed in claim 6, wherein said input piston carried a third seal which is spaced outwardly from the one of said two seals which is remote from said control valve means, and a passage in said input piston provides communication between adjacent faces of the two outermost of said three seals, and the innermost face of the said three seals which is carried by said input piston.

10. A pedal-operated booster as claimed in claim 1, wherein said valve mechanism and said input piston are arranged for relative movement, and said application of said fluid pressure to said pressure-responsive face causes said valve mechanism to move relative to said input piston, causing said control valve means to shut off communication between said boost chamber and said exhaust port, and to open communication between said inlet port and said boost chamber.

11. A combined pedal-operated booster and master cylinder assembly for operating an actuator of a vehicle hydraulic system, said assembly being of the type in which an input force applied to said booster is augmented by said booster and said augmented force is applied to said master cylinder to actuate said master cylinder, said booster comprising a housing provided with a bore, an inlet port for connection to a fluid pressure source and an exhaust port for connection to a reservoir for fluid, an input member, and a boost piston working in said bore, means defining a boost chamber in said bore, and a control valve means for controlling pressurisation of said boost chamber by said pressure fluid from said source by controlling communication between said boost chamber and said inlet and exhaust ports, said control valve means including a pressure-responsive means, pressurisation of said boost chamber following movement of said input member in response to said input force acting to advance said boost piston in said bore so that said booster provides an output force to be applied to said master cylinder, said master cylinder comprising a housing provided with a bore, a master cylinder piston working in said master cylinder bore, means defining a pressure space forward of said master cylinder piston in said bore for connection to an actuator and a fluid reservoir for said master cylinder, a recuperation valve controlling communication between said pressure space and said master cylinder fluid reservoir, and said master cylinder piston being advanced in said bore in response to the force from said booster and being operative firstly to close said recuperation valve to cut off communication between said pressure space and said master cylinder reservoir, and subsequently to pressurise fluid in said pressure space, said input member including means for operating said control valve means during an initial movement of said input member in an actuator-applying direction to effect application of fluid pressure from said source to said pressure-responsive means such that said control valve means is operative to cause fluid pressure from said source to generate directly in said booster a force for application to said master cylinder, said force being sufficient to advance said master cylinder piston to close said recuperation valve, said input member also including means for operating said control valve means during further movement of said input member to cause said booster to apply to said master cylinder a force proportional to the input force.

12. An assembly as claimed in claim 11, wherein said application of said fluid to said pressure-responsive face causes said control valve means to be operative to pressurise said boost chamber to provide said force to be applied to said master cylinder to advance said master cylinder piston to close said recuperation valve.

13. An assembly as claimed in claim 11, wherein said control valve means comprises a valve spool provided with said pressure-responsive face, and means are provided for coupling said spool to said input piston for limited relative movement in a longitudinal direction, said spool being movable relative to said input piston to control pressurisation of said boost chamber, and said input piston carries a stop for limiting the distance through which said spool can move relative to said input piston, the position of said stop being chosen such that the point at which said spool engages with said stop is reached shortly after said master cylinder piston closes said recuperation valve.

14. A pedal-operated booster for a vehicle hydraulic system comprising a housing provided with a longitudinal bore, an inlet port for connection to a fluid pressure source and an exhaust port for connection to a reservoir for fluid, an input member for actuation by a pedal, an output member for exerting an output force, fluid pressure responsive means for applying a force to said output member, said fluid pressure responsive means having two stages of operation, in a first stage said fluid pressure responsive means applies a fluid pressure force from said source directly to said output member to move said output member through a limited distance and in a second stage said fluid pressure responsive means is operative to apply a boost force to said output member to augment the output force thereof, control valve means for controlling the supply of fluid pressure directly from said source to said fluid pressure responsive means in response to relative movement of said input member and said fluid pressure responsive means, said input member including means for operating said control valve means during an initial movement of said input member to supply fluid pressure from said source directly to said fluid pressure responsive means to move said means through said first stage of operation, said input member also including means for operating said control valve means during further movement of said input member to supply fluid pressure from said source to said fluid pressure responsive means to move said means through said second stage of operation.

15. A pedal-operated booster for a vehicle hydraulic system comprising a housing provided with a longitudinal bore, an inlet port for connection to a fluid pressure source and an exhaust port for connection to a reservoir for fluid, an input member for actuation by a pedal, an output member through which an output force acts, a boost piston for augmenting said output force working in said longitudinal bore, said boost piston being advanced in said longitudinal bore in response to fluid pressure from said source pressurising a boost chamber in said longitudinal bore, a control valve means including a boost control valve for controlling the supply and exhaust of pressure fluid from said source in response to relative movement of said input member and said boost piston, whereby said control valve means controls pressurisation of said boost chamber, and said booster has two stages of operation, said input member including means for operating said control valve means during an initial movement of said input member such that in a first stage of operation said control valve means is operative to control the supply of pressure fluid from said source to cause said output member to move through a limited distance, said input member also including means for operating said control valve means during further movement of said input member such that in a second stage of operation said control valve means is operative to pressurise said boost chamber to cause continued movement of said output member in proportion to said further movement of said input member, and said control valve means has a part with a pressure-responsive face, said part being movable relative to said input member and including means for operating said control valve means on movement of said part, and in said first stage fluid pressure from said source causes pressure fluid to be applied to said pressure-responsive face, and on movement of said part in response to said application of said fluid to said pressure-responsive face, said means on said part operated said control valve means to cause said movement of said output member through said limited distance.

16. A pedal-operated booster for a vehicle hydraulic system comprising a housing provided with a longitudinal bore, an inlet port for connection to a fluid pressure source and an exhaust port for connection to a reservoir for fluid, an input member for actuation by a pedal, an output member for exerting an output force, a boost chamber, fluid pressure responsive means for applying a force to said output member, said fluid pressure responsive means having two stages of operation, in a first stage said fluid pressure responsive means applies a fluid pressure force from said source directly to said output member to move said output member through a limited distance and in a second stage said fluid pressure responsive means is operative, in response to pressurisation of said boost chamber by fluid from said source to apply a boost force to said output member to augment the output force thereof, control valve means for controlling the supply of fluid pressure directly from said source to said boost chamber and said fluid pressure responsive means in response to relative movement of said input member and said fluid pressure responsive means, said input member including means for operating said control valve means during an initial movement of said input member to supply fluid pressure from said source directly to said boost chamber and directly to said fluid pressure responsive means to move said means through said first stage of operation, said input member also including means for operating said control valve means during further movement of said input member to supply fluid pressure from said source to pressurise said boost chamber, pressurisation of said boost chamber acting to move said fluid pressure responsive means through said second stage of operation.

* * * * *